(12) United States Patent (10) Patent No.: US 12,668,290 B2

Piper et al. (45) Date of Patent: Jun. 30, 2026

(54) FOLDABLE DEVICES FOR TRANSPORTING LOADS

(71) Applicant: LOCHER, PIPER & PARTNER GMBH, Aarau (CH)

(72) Inventors: Marian Piper, Valdés (ES); Francois Locher, Berlin (DE)

(73) Assignee: LOCHER, PIPER & PARTNER GMBH, Aarau (CH)

( * ) Notice: Subject to any disclaimer, the term of this patent is extended or adjusted under 35 U.S.C. 154(b) by 909 days.

(21) Appl. No.: 17/773,910

(22) PCT Filed: Oct. 30, 2020

(86) PCT No.: PCT/EP2020/080560

§ 371 (c)(1),
(2) Date: May 3, 2022

(87) PCT Pub. No.: WO2021/089435

PCT Pub. Date: May 14, 2021

(65) Prior Publication Data

US 2022/0410953 A1     Dec. 29, 2022

(30) Foreign Application Priority Data

Nov. 4, 2019    (CH) ...................................... 1393/19

(51) Int. Cl.
B62B 3/02          (2006.01)
B62B 7/08          (2006.01)

(52) U.S. Cl.
CPC .............. B62B 3/022 (2013.01); B62B 7/083 (2013.01); *B62B 2205/04* (2013.01)

(58) Field of Classification Search
CPC .. B62B 3/022; B62B 3/02; B62B 3/00; B62B 2205/04; B62B 2205/06; B62B 2205/00;
(Continued)

(56) References Cited

U.S. PATENT DOCUMENTS 2,623,755 A  *  12/1952  Terry ...................... B62B 3/022
                                                        211/202
3,259,369 A  *   7/1966  Gridley ................. B66F 7/0666
                                                        187/269
(Continued)

FOREIGN PATENT DOCUMENTS

DE          3614877 A1    11/1986
EP          0890534 A1     1/1999
(Continued)

OTHER PUBLICATIONS

International PCT Search Report for corresponding International Application Serial No. PCT/EP2020/080560, dated Jan. 12, 2021, pp. 1-2.

*Primary Examiner* — James M Dolak

(74) *Attorney, Agent, or Firm* — Tarolli, Sundheim, Covell & Tummino LLP

(57) ABSTRACT

The invention relates to a foldable device (3000) for transporting loads, the foldable device comprising: a first platform (3200); a running gear (3100), the running gear comprising a plurality of arms (3110) and a plurality of wheels (3130), each of the plurality of arms being rotatably coupled to the first platform and at least one of the plurality of wheels; and a device for aligning the plurality of arms and the plurality of wheels, which is configured to rotate each of the plurality of arms and each of the plurality of wheels by a rotary angle between at least one open and one folded state, wherein the plurality of arms and the plurality of wheels are arranged under the first platform when in the folded state.

18 Claims, 11 Drawing Sheets

(58) Field of Classification Search

CPC .. B62B 7/083; B62B 7/06; B62B 7/00; B62B 7/086

See application file for complete search history.

(56) References Cited

U.S. PATENT DOCUMENTS

| | | | |
|---|---|---|---|
| RE27,914 E * | 2/1974 | King | F16H 21/04 |
| | | | 182/69.5 |
| 3,827,840 A * | 8/1974 | Kistler | E04G 19/003 |
| | | | 52/109 |
| 4,008,671 A * | 2/1977 | Baldini | A47B 31/04 |
| | | | 108/177 |
| 4,288,195 A * | 9/1981 | Brewer | B66F 7/08 |
| | | | 187/269 |
| 4,655,466 A * | 4/1987 | Hanaoka | B62B 3/02 |
| | | | 187/269 |
| 4,682,750 A * | 7/1987 | Rudolph | B66F 7/0625 |
| | | | 254/9 C |
| 5,002,293 A * | 3/1991 | Gottselig | B62B 3/02 |
| | | | 280/47.35 |
| 6,431,319 B1 * | 8/2002 | Myers | B62B 3/02 |
| | | | 187/244 |
| 6,857,493 B2 * | 2/2005 | Shupp | B66F 7/14 |
| | | | 318/587 |
| 6,923,466 B2 * | 8/2005 | Tsai | B62B 1/125 |
| | | | 280/42 |
| 7,249,771 B1 * | 7/2007 | Brennan | B60R 11/06 |
| | | | 280/35 |
| 8,172,255 B1 * | 5/2012 | Martin | B62B 3/04 |
| | | | 187/244 |
| 8,424,883 B1 * | 4/2013 | Ramos | B62B 3/02 |
| | | | 280/47.35 |
| 9,387,869 B1 * | 7/2016 | Berger | A45C 15/00 |
| 9,815,672 B2 * | 11/2017 | Baudermann | B66F 17/00 |
| 9,999,489 B1 * | 6/2018 | Kern, Sr. | B66F 7/0625 |
| D822,992 S * | 7/2018 | Berger | D3/274 |
| 10,780,907 B1 * | 9/2020 | Camarco | B66F 7/0625 |
| 10,843,616 B2 * | 11/2020 | Lai | B62B 3/02 |
| 11,338,837 B2 * | 5/2022 | Falomir Estarelles | B62B 9/12 |
| 11,440,575 B2 * | 9/2022 | Baldridge | B62B 3/022 |
| 11,554,943 B2 * | 1/2023 | Schwalbach | B66F 9/22 |
| 11,639,286 B2 * | 5/2023 | O'Connell | B60R 9/06 |
| | | | 254/84 |
| 11,952,249 B2 * | 4/2024 | Schwalbach | B62B 5/0053 |
| 12,330,703 B2 * | 6/2025 | Robaina | B62B 5/00 |
| 12,344,011 B2 * | 7/2025 | Robinson | F16M 11/38 |
| 12,409,876 B2 * | 9/2025 | Lauderbaugh | B62B 3/04 |
| 12,434,751 B2 * | 10/2025 | Devis | B62B 3/022 |
| 12,509,279 B2 * | 12/2025 | Costanzo | B65D 21/08 |
| 2004/0113396 A1 | 6/2004 | Tsai | |
| 2005/0140119 A1 | 6/2005 | Wong | |
| 2020/0164908 A1 * | 5/2020 | Chen | B62B 3/022 |

FOREIGN PATENT DOCUMENTS

| JP | S51102846 A | 9/1976 |
|---|---|---|
| JP | H0761352 A | 3/1995 |
| JP | 3066132 U | 2/2000 |
| JP | 2005170264 A | 6/2005 |

* cited by examiner

1000

1500

1400
1200

1600

1300

1100

A

A

FOLDABLE DEVICES FOR TRANSPORTING LOADS

RELATED APPLICATIONS

This application is a U.S. National Stage Application filed under 35 USC 371 claiming priority to Serial No. PCT/EP2020/080560, filed on 30 Oct. 2020; which claims priority from Patent Application CH 01393/19, filed 4 Nov. 2019, the entireties of which are hereby incorporated herein by reference.

FIELD OF THE INVENTION

The present invention relates to foldable devices for transporting loads, and in particular to a fully foldable and continuously height-adjustable chassis which, depending on the attachment, can serve as a base for a stroller, a transport cart or a transport trailer with various possible uses.

BACKGROUND

From the state of the art, strollers have been known for a long time. The space requirement when they are not in use (folding size) is often the problem. Especially for transport, strollers have to be folded as compactly as possible. Robustly designed strollers, however, cannot be folded into a minimal, compact, cuboid shape. Thus, they are difficult to stack and stow with other suitcase-shaped luggage, e.g., in the trunk of a car. Moreover, they take up a lot of storage space there.

In the case of the known foldable strollers, the common folding method includes that after folding one of the two distances of the wheels, longitudinal or transverse to the direction of travel, the other distance remains and thus significantly affects the folding volume. Strollers with a particularly small folding volume achieve this at the expense of robustness and design, since they have a particularly large number of joints and moving parts. Many purely mechanical strollers are difficult to handle, especially with regard to the conversion from a driving position to a transport position. At least one of the two operations, fully opening or folding the chassis, must be done manually and is thus more cumbersome than, for instance, when opening the chassis by simply operating the lift and folding it automatically by pressing a button. Folding a chassis should be as easy as possible for a user.

Robustly designed strollers usually cannot be folded completely without disassembling individual components, usually the wheels. Disassembly takes additional time. If dirty wheels have to be dismantled, this can also lead to hygienic problems if they come into contact with hands or textile covers of the stroller, for example.

The well-known strollers can only be folded without, and not optionally with or without stroller attachment and mattress. Thus, the stroller top must be removed before folding, even if you actually want to store it together with the chassis. The stroller attachment cannot be folded and thus takes up a lot of storage space, especially if it is not used at all for transporting the child, such as during a car trip.

The known strollers can be transported in a folded state only by carrying but cannot be carried next to you like a rolling suitcase. This is because the weight of the folded stroller is considerable for being carried for longer distances. Thus, the stroller attachment has to be transported separately. Especially while traveling, this increases the number of bulky and heavy pieces of luggage that have to be carried.

With the known baby carriages, the track width cannot be adapted to the conditions and widened or narrowed as required. Thus, one cannot choose to increase their stability on uneven terrain or with a high center of gravity by widening the track width, or narrowing the track width to improve maneuverability in confined conditions, such as crowds or public transportation aisles.

In known folding strollers, the chassis typically includes two non-swiveling large rear wheels connected by a transverse axle, and two swiveling small front wheels, or two non-swiveling large wheels each at the front and rear. No known stroller has four large wheels of the same size, all of which can swivel 360° or lock in pairs as needed. This means that maneuverability cannot be optimally adapted to the circumstances and maximum maneuverability cannot be achieved, for example, in very confined conditions (restaurant, supermarket, crowds, etc.). In known strollers, when the direction of travel is changed, either a driving behaviour or maneuverability changes, or, in order to maintain the driving behaviour or maneuverability, a seat or reclining device must be disassembled, rotated 180°, and then reassembled.

The suspension of known strollers, when present, is usually externally mounted as a movable part. Externally mounted suspension increases volume and weight, usually detracts from appearance due to its visibility, and wears out as the stroller is used.

In the only foldable stroller currently known on the market with a height-adjustable reclining or seating surface, the difference in height between the lowest and highest position is a maximum of 20 cm. As a result, even in their highest position, recliners or seats are still too low for particularly tall parents. In their lowest position, on the other hand, the reclining position is still too high for seated parents to have eye contact with their child. In particular, a child who can already walk cannot get in and out of the seat device independently, so instead he or she must always be lifted in and out. Strollers that are adjustable in height operate without counterpressure to partially compensate for the child's weight, making it difficult or impossible to adjust the height when the child is sitting or lying in the stroller. Moreover, in order to adjust the height, the child must always be removed from the carriage before the height adjustment can be made.

Known chassis cannot be universally and modularly converted from a stroller to a cargo cart for other types of transportation, such as shopping-, hand- or tool carts, due to their design form.

Known transport trolleys do not offer the following possibilities at the same time: modular interchangeable transport units, height adjustment of the transport unit, removal of the transport unit, and the automatic reduction of the chassis to a minimum folding size without disassembly.

Therefore, there is a need for a device that overcomes the above mentioned problems. These problems are solved by the device for transporting loads according to the present description.

The chassis of the device for transporting loads has a minimum folding dimension, as a stroller including or excluding the reclining or seating device, sun canopy, mattress and storage devices. The folding dimension may be in the form of a cuboid in the case of the stroller with or without the reclining or seating device, so that the device can be stacked and stowed with other luggage like a small suitcase, such as a carry-on suitcase. Components, particularly the wheels, do not have to be disassembled in order to achieve the minimum folded size.

The folded device can be transported with or without a reclining or seating device, like a wheeled suitcase, by its push handle, or it can be parked freestanding. The design allows the possibility of changing the track width of the device as needed, so that, for example, its driving stability in difficult terrain can be increased by widening the track width. The chassis can have four large wheels, optionally of the same diameter, which can be optionally lockable or at least in pairs completely free to swivel.

The device may further have a minimal folding size and weight because a suspension may be integrated in its chassis and/or lift may be integrated in the supporting structure. The chassis of the device may open automatically by actuating a height adjuster and fold purely mechanically or electromechanically at the push of a button.

Lounger, seat or multifunctional attachments can be coupled to the device and can be folded onto the chassis, including their accessories such as a sun deck, mattress or storage devices, in order to achieve a minimum folding size.

SUMMARY OF INVENTION

The invention is defined by the independent claims. The independent claims define advantageous embodiments.

According to a first embodiment, a foldable device for transporting loads, comprises a first platform; a chassis, the chassis comprises a plurality of booms and a plurality of wheels, each of the plurality of booms being rotatably coupled to the first platform and to at least one of the plurality of wheels; and a device for aligning the plurality of booms and the plurality of wheels configured to rotate each of the plurality of booms and each of the plurality of wheels between at least an open state and a folded state through a respective rotation angle, wherein the plurality of booms and the plurality of wheels are disposed below the first platform in the folded state.

According to a second embodiment, the foldable apparatus according to the first embodiment comprises a lift, the lift comprising a plurality of foldable stays, each of the plurality of foldable stays being rotatably coupled to the first platform.

According to a third embodiment, each of the plurality of foldable stays according to the second embodiment comprises a first long arm, a second long arm, and a short arm, wherein the first long arm is foldable, and the short arm is rotatably coupled to the second long arm.

According to a fourth embodiment, the foldable device according to the second embodiment or the third embodiment further comprises a second platform, wherein the second platform is liftable and coupled to the lift.

According to a fifth embodiment, the second platform according to the fourth embodiment comprises a plurality of guide rails, in which the second long arm of each of the plurality of foldable stays is rotatably coupled to at least one of the plurality of guide rails.

According to a sixth embodiment, the plurality of guide rails according to the fifth embodiment each comprise a carriage for raising and lowering the lift.

According to a seventh embodiment, the second platform according to any of the fourth through sixth embodiments comprises a pulley system for raising and lowering the lift.

According to an eighth embodiment, the second platform according to any of the third through seventh embodiments further comprises a plurality of gas springs for raising and lowering the lift configured to resiliently lock the lift in place.

According to a ninth embodiment, the second platform according to any of the third through eighth embodiments further comprises a plurality of controls or actuators for raising and lowering the lift.

According to a tenth embodiment, the foldable device according to any of the second through ninth embodiments further comprises a foldable attachment, in which the foldable attachment is configured to couple to the second platform.

According to an eleventh embodiment, the foldable attachment according to the tenth embodiment surrounds the foldable device in the folded state in a U-shape.

According to a twelfth embodiment, the foldable device according to any of the first through eleventh embodiments has a cuboid shape in the folded state.

DETAILED DESCRIPTION

The dimensions shown in the figures, the resulting size ratios of the respective features, and their relative arrangement may be chosen differently in other embodiments without departing from the scope of the present disclosure.

5.1 Overview of Stroller with Lounger 5.1.1 Opened State—Perspective View

Figure 1:
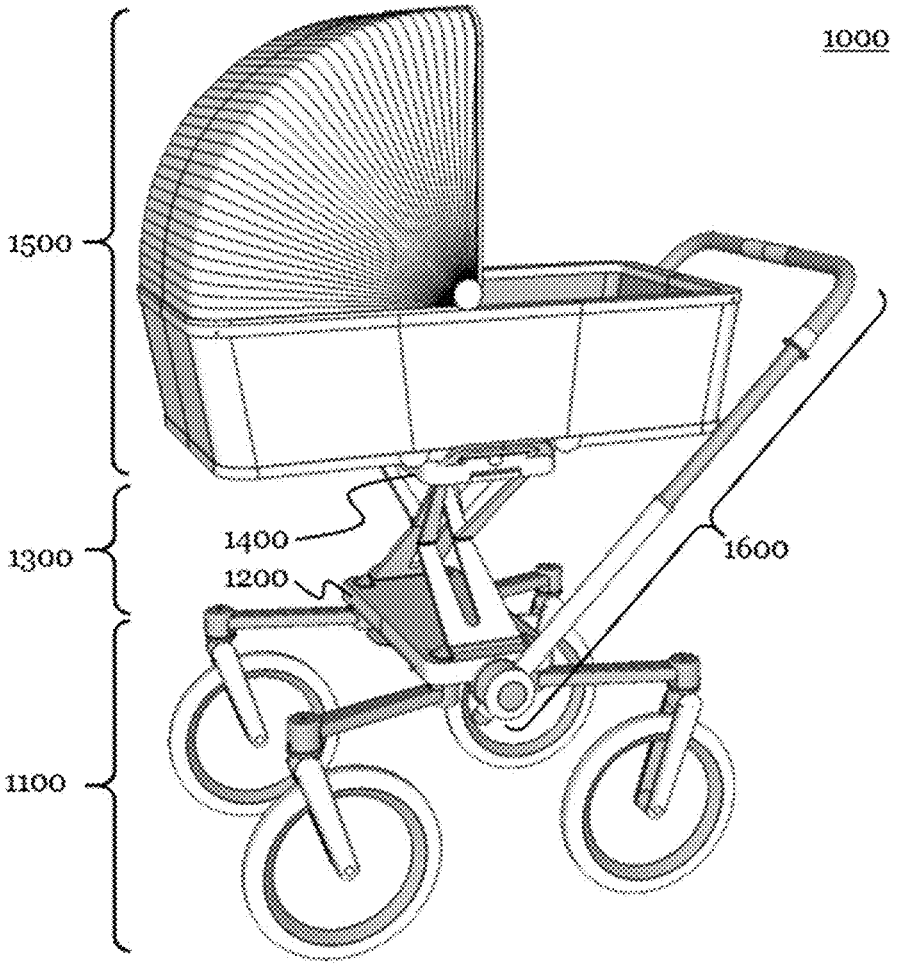
FIG. 1 shows a perspective overall view of an exemplary embodiment of a device for transporting loads with a lounger in an open state.

FIG. 1 shows an overall perspective view of an exemplary embodiment of a device 1000 for transporting loads with a cradle in an opened state. The foldable device 1000 comprises a chassis 1100, a lower platform 1200, a lift 1300, an upper platform 1400, an attachment 1500 such as a stretcher, a seat or a multifunctional platform, and a swivel slider 1600. The individual assemblies 1100 to 1600, their couplings and their interaction during opening, folding, adjusting and locking of the individual assemblies 1100 to 1600 or of the device 1000 as a whole are described in detail below with reference to the figures. The device 1000 has a modular design and can optionally be designed for transporting children or for transporting objects.

5.1.2 Folded State—Perspective View

Figure 2:
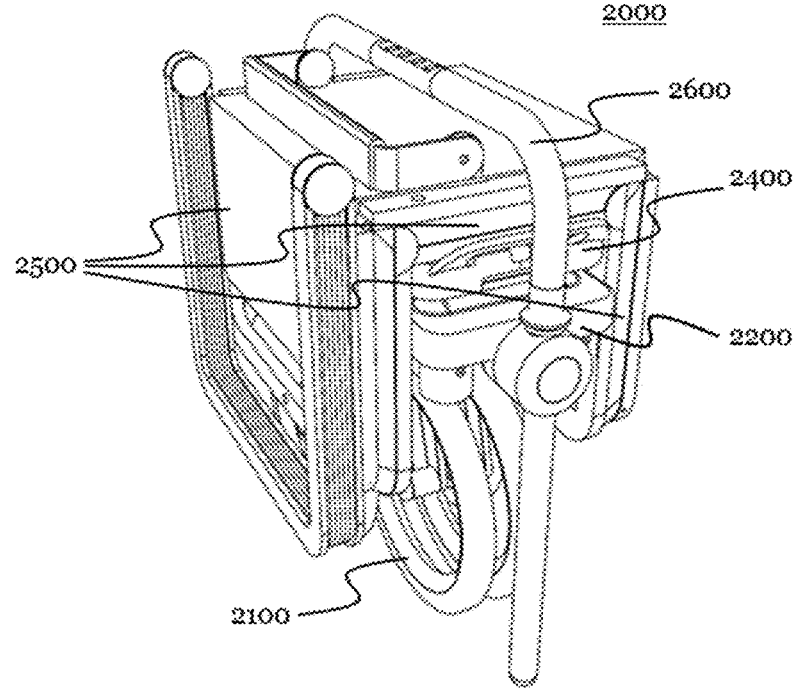
FIG. 2 shows a perspective overall view of an exemplary embodiment of a device for transporting loads with a lounger in a folded state.

FIG. 2 shows the device shown in FIG. 1 in a folded state 2000. The device can be transferred from an open state (cf. FIG. 1) to a folded state 2000 both with and without an attachment 2500 (lounger, seat, multifunctional platform, etc.) including its accessories (e.g. a sun canopy or a mattress (not shown)) in any driving position and without dismantling individual components. In the folded state 2000, the device may have a shape of a cuboid, so that the device has a minimal folding dimension. The folding of the chassis 2100 from the opened (cf. FIG. 1) to a folded state 2000 can be performed automatically and purely mechanically "at the push of a button", as explained in detail with reference to the following drawings.

In the folded state 2000, the device can be transported by rolling on the ground on its wheels aligned parallel under the lower platform 2200 on the chassis 2100, comparable to a rolling suitcase. A handle of a swivel slider 2600 may be telescopically extended or shortened in this regard. When the pivot slide 2600 is telescopically shortened, the device 2000 can be lifted in a folded state, for example, to stow it. Due to the shape of a cuboid, with or without attachment 2500, the device 2000 can be stacked in a space-saving manner in the folded state, for example with other cuboid-shaped luggage such as suitcases.

The folding size of the device in the folded state 2000 without the attachment 2500 (base frame) can meet the recommendation of the International Air Transport Association (IATA), according to which the sum of length, width and height of a piece of luggage should not exceed 115 cm.

5.2 Device without Attachment (Base Frame)

5.2.1 Open State—Scale Projections

Figure 3:
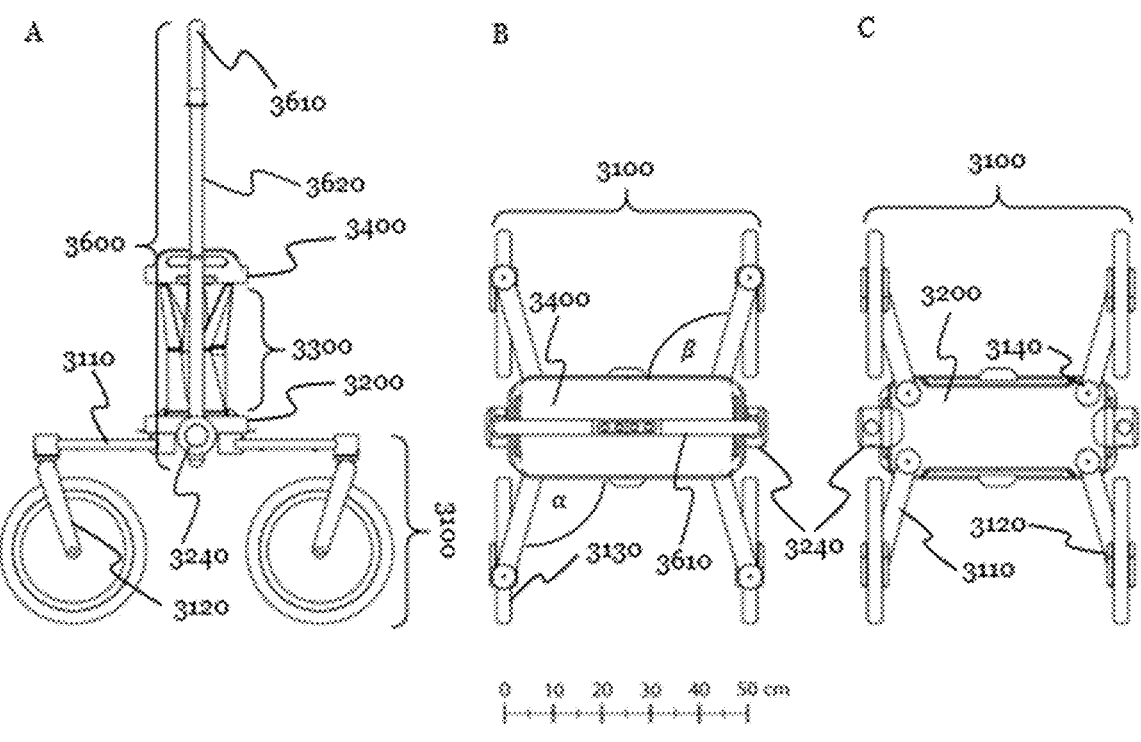
FIG. 3 shows three scaled projections (side view A; top view (from above) B; top view (from below) C) of an exemplary embodiment of a chassis in an opened state, coupled with a lower platform, a lift and an upper platform, and a swivel pusher.

FIG. 3 shows three true-to-scale projections of an exemplary embodiment of a chassis 3100 in an open state, coupled with a lower platform 3200, a lift 3300 and an upper platform 3400, as well as a swivel slide 3600 (device 1000 in FIG. 1 without attachment/base frame). In the open state, the height of the upper platform 3400 with respect to the lower platform 3200 can be adjusted and resiliently or fixedly locked by an operation of the lift 3300 via an operating element, for example, attached to the side of the upper platform 3400. The height can be adjusted between a minimum height of o cm to a maximum height of 35 cm. In other embodiments, other minimum and maximum heights are also possible, depending on the specific use of the device. The height can be adjusted continuously.

The swivel pusher 3600 further comprises a pusher handle 3610 rigidly coupled to two telescopic arms 3620 on the left and right sides. The two telescoping arms 3620 each include an upper sub-arm that can be telescoped from a lower sub-arm and locked in place, thereby allowing a length of the swivel slider 3600 to be varied and adjusted, for example, to accommodate the height of a user.

The lower sub-arms of the swivel slide 3600 are each rotatably and slidably coupled at their lower ends to the lower platform 3200 via a slide pivot 3240. The slider pivot joints 3240 allow the angle of the pivot slider 3600 to be changed with respect to the lower platform 3200, and the pivot slider 3600 can be locked at any angle with respect to the lower platform 3200. By changing the angle, the swivel slide 3600 can be adjusted to accommodate the size of a user or adapted for a direction or style of travel without changing the orientation of an attachment. This can also avoid, for example, having to rotate a recliner or seat 180° to allow eye contact with a child in the recliner or seat.

At the lower side of the lower platform 3200 (cf. FIG. 3 C), four lockable booms 3110 are rotatably coupled to the lower platform by boom pivot joints 3140 in the corner regions thereof. In one embodiment, the lockable booms 3110 form an identical angle $\alpha=\beta$ with respect to the lower platform 3200 when open. The angle $\alpha$ may be 90° or greater. By changing the angle, a track width can be changed. In another embodiment, the lockable booms 3110 form a pairwise different angle $\alpha\neq\beta$ with respect to the lower platform 3200.

At their outer ends, the four lockable booms 3110 are coupled to steering forks 3120, each of which is coupled to a wheel 3130. The diameters of the wheels may differ in pairs, for example, front and rear. The steering forks 3120 may be free to rotate 360° or may be lockable in pairs, e.g., front or rear, in the direction of escape, so that the travel characteristics of the chassis can be adjusted in any direction of travel. The steering forks 3120 may be angled relative to their vertical axis so that the wheels 3130 are automatically aligned in the direction of travel when they move freely (caster).

5.2.2 Folded State—Scale Projections

Figure 4:
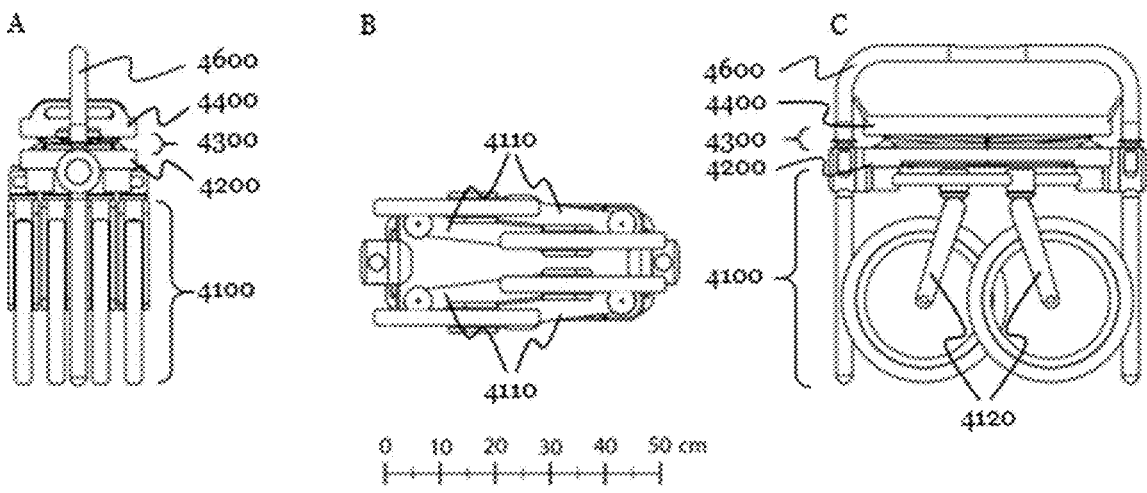
FIG. 4 shows three scaled projections (side view A; top view (from below) B; front/rear C) of an exemplary embodiment of a chassis in a fully folded state coupled with a lower platform, a lift and an upper platform, and a swivel pusher.

FIG. 4 shows three scale projections of an exemplary embodiment of a chassis 4100 in a fully folded state, coupled with a lower platform 4200, a lift 4300 and an upper platform 4400, as well as a swivel slide 4600 (device 2000 in FIG. 2 without attachment/base frame). In a fully folded state, the front and rear pairs of booms 4110 are rotated in maximally toward the wider sides of the lower platform 4200. In a fully folded state, the front and rear pairs may be mirror images of each other in the projection of FIG. 4 B. Locking of the booms 4110 is also possible in this position.

The steering forks 4120 of each of the inner pair of booms 4110 and the outer pair of booms 4110 are directed outwardly, toward the narrower sides of the lower platform 4200, to maximize a distance between support points of the inner wheels 4130 and the outer wheels 4130 in order to maximize the stability of the folded chassis 4100. The steering forks may also both be directed inwardly or directed inwardly or outwardly in pairs.

The steering forks 4120 can be locked in alignment parallel to the wide sides of the lower platform 4200, so that the folded chassis 4100 can also be rolled along the ground on the pivot slide 4600 like a rolling suitcase. The booms 4110 can also be locked in other positions.

In order to achieve a minimum packing size of the basic frame (device 2000 in FIG. 2 without attachment), the height of the upper platform 4400 with respect to the lower platform 4200 can be changed by operating the lift 4300 so that the upper platform 4400 lies directly on the lower platform 4200. The upper platform 4400, the lift 4300, or the lower platform may be locked in this or any other position.

When fully folded, the two upper sub-arms of the vertically oriented pivot slide 4600 are telescoped maximally into or over the lower sub-arms. They can be locked in this or any other position. The telescopically shortened pivot slide 4600 may be lowered through the slide pivot 4210 until the lower ends of the lower sub-arms are just above the ground. The lower ends of the lower sub-arms may be equipped with ball casters to provide increased stability to the chassis 4100 when folded or in a folded condition.

5.2.3 Coupling of the Booms

Figure 5:
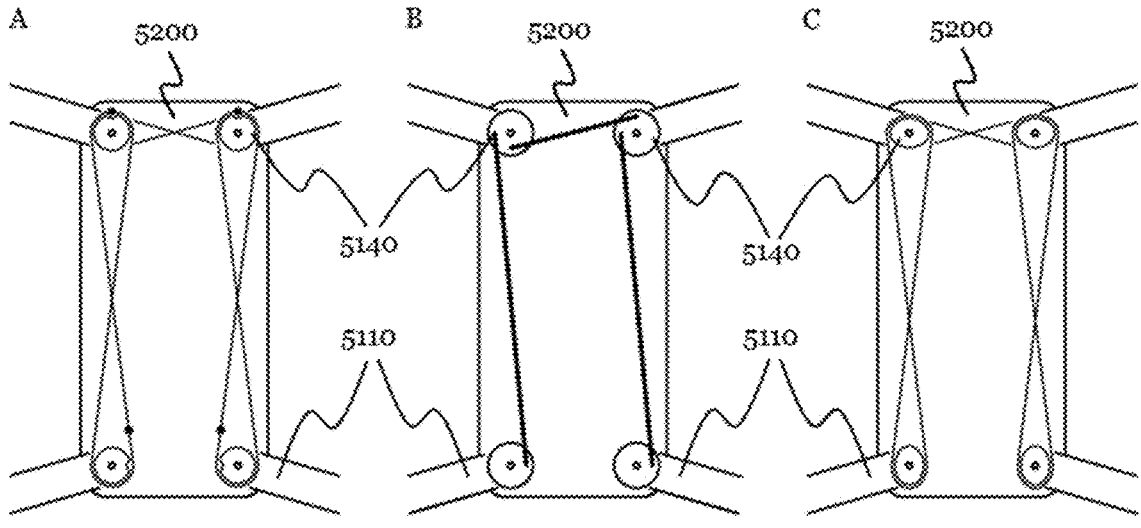
FIG. 5 shows three exemplary schematic embodiments of a coupling of the boom pivot joints by a cable system with or without drivers (top view A), by linkages (top view B) and by belts (top view C).

FIG. 5 shows three exemplary schematic embodiments of a coupling of the boom pivot joints 5140 by means of a cable system with or without drivers (top view A), by linkages (top view B) and by belts (top view C). The booms 5110 are coupled together so that they move in sequence at predetermined intervals during automatic opening and folding of the chassis. In this way, the booms 5110, steering forks, and wheels (not shown) do not lock each other and the chassis remains in balance during automatic opening and folding. The coupling and coordinated time delay of a movement of the booms 5110 may be accomplished, for example, by means of cables with or without appropriately placed drivers (View A), by means of a linkage with different levers (View B), or by means of toothed belts and non-circular toothed belt wheels (View C), or by a combination thereof. In other embodiments, the booms 5110 can alternatively or additionally be moved and controlled electromechanically, for example, by means of servomotors.

5.3 Lift Assembly (without Chassis)

5.3.1 Opened State—Perspective View

Figure 6:
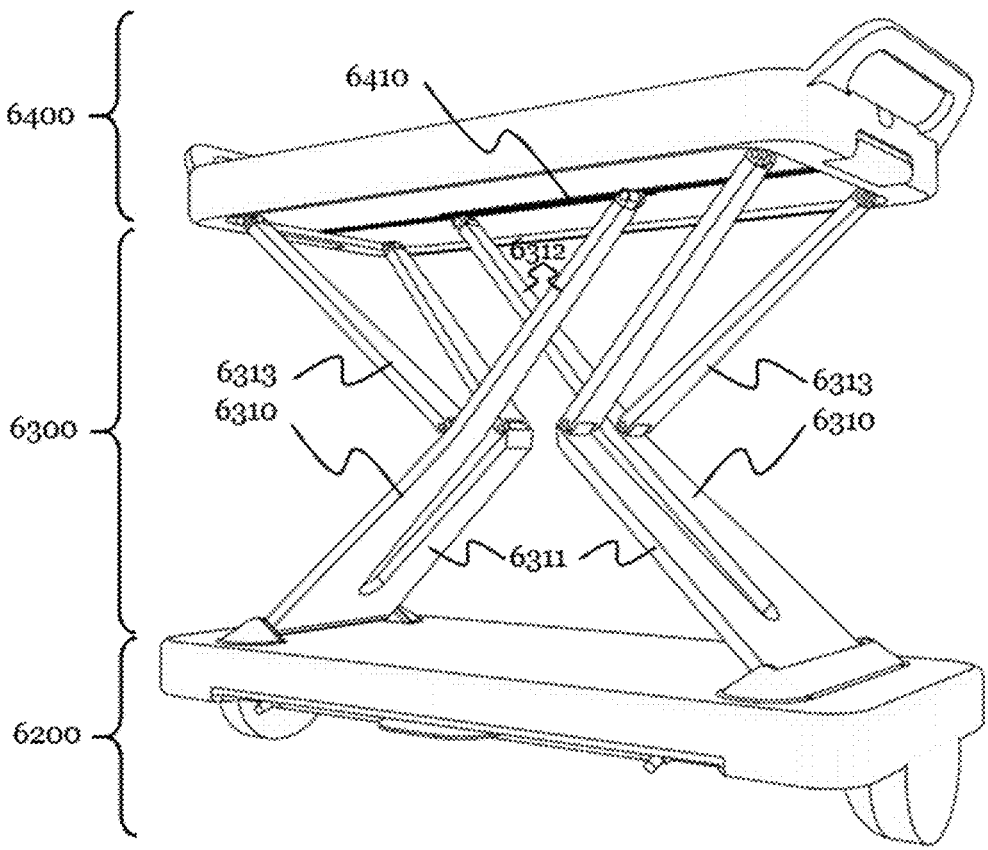
FIG. 6 shows a perspective view of an exemplary embodiment of a lift in an open state, coupled with a lower and an upper platform.

FIG. 6 shows a perspective view of an exemplary embodiment of a lift 6300 in an open state, coupled to a lower 6200 and an upper 6400 platform. The lift 6300 is coupled to the lower 6200 platform and the upper 6400 platform. In the embodiment shown, the lift includes two foldable stays 6310. In other embodiments, the lift 6300 may include a plurality of foldable stays 6310. The foldable stays 6310 are each rotatably coupled at least in part to the lower platform and/or to the upper platform. Each of the foldable stays shown includes a first long arm 6311, a second long arm 6312, and a short arm 6313. The first long arm 6311 is foldable. The first long arm 6311 includes a first portion rigidly coupled to a first portion of the second long arm 6312. A second portion of the first long arm 6311 is rotatably coupled to the first portion of the first long arm 6311.

A length of the second portion of the first long arm 6311 is substantially equal to a length of the short arm 6313. The short arm 6313 is rotatably coupled to the second long arm 6312. The second long arm 6312 includes the first portion and a second portion. A length of the second portion of the second long arm 6312 is substantially equal to a length of the short arm 6313 or a length of the second portion of the first long arm 6311. The first long arm 6311 and the short arm 6313 are each coupled to the lower 6200 and the upper 6400 platforms, respectively, at a corner region of the lower 6200 and the upper 6400 platforms, respectively. The second long arm 6312 is coupled to a guide rail 6410 of the upper platform 6400 and is movable along the guide rail 6410. The second long arm 6312 of a first shear 6310 and the second long arm 6312 of a second shear 6310 may be coupled to the same guide rail 6410 or each may be coupled to a different guide rail 6410.

The guide rail 6410 extends in a direction perpendicular to the push or pull direction of the device for transporting loads substantially across a width of the upper platform 6400. In a preferred embodiment, the guide rail 6410 is arranged substantially at a center with respect to the length perpendicular to the width of the upper platform 6400 to provide stability of the lift under load. However, other arrangements of the guide rail 6410 are also possible. The upper platform 6400 may also include a plurality of guide rails arranged in different regions of the upper platform 6400 and having different lengths. In the embodiment shown, the guide rail 6410 is substantially the same length as the first 6311 or second 6312 long arm and substantially twice the length of the short arm 6313. However, other length ratios are also possible.

5.3.2 Open State—True-to-Scale Projections

Figure 7:
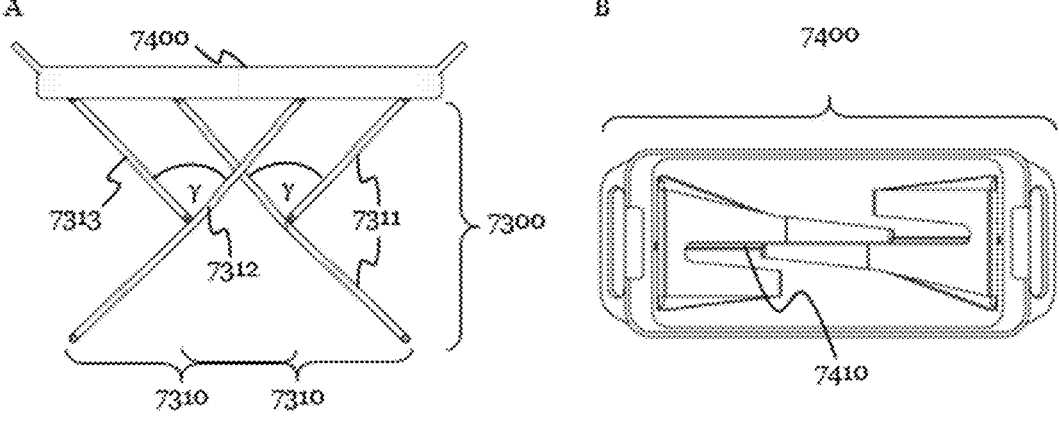
FIG. 7 shows a scaled front or rear projection (A) and a scaled projection (top view (from below) B) of an exemplary embodiment of a lift in an open state, coupled with an upper platform.

FIG. 7 shows a scaled front or rear projection (A) and a scaled projection (top view (from below) (B) of an exemplary embodiment of a lift 7300 according to FIG. 6 in an open state coupled to an upper platform 7400. The lift 7300 comprises two foldable stays 7310, each comprising a first 7311 and a second 7312 long arm and a short arm 7313. The short arm 7313 is coupled to the second long arm 7312 and the upper platform 7400. The short arm 7313 forms an angle γ with the second 7312 long arm. Using a single guide rail rotatably coupled to both long arms 7312 of the respective shears 7310, the angle γ is approximately 45° when fully open. Using multiple guide rails, each rotatably coupled to a respective long arm 7312, the angle γ may be less than 45° in the fully open state, such as 0°<γ<45°, 10°<γ<35°, or 20°<γ<25°.

When adjusting a height of the lift, the angle γ is decreased (raising) or increased (lowering) by holding the coupling of the short arms 7313 with the upper platform 7400 with respect to the upper platform 7400, while the couplings of the second long arms 7312 with the upper platform 7400 are displaced in opposite directions along the common guide rail or the respective guide rail away from the coupling of the respective short arm 7313. As described in detail below with reference to FIG. 9, the lift 7300 can be continuously adjusted in height between a folded state and an open state and can be locked in position at any height. In the embodiment shown, the maximum height of the lift 7300 in the fully open state is substantially equal to the length of the first 7311 or the second 7312 long arm.

The first long arm 7311 of a respective pair of stays 7310 is foldable. The first long arm 7311 includes a first portion rigidly coupled to a first portion of the second long arm 7312, and a second portion rotatably coupled (foldability) to the first portion of the first long arm 7311. The second section is rotatably coupled to the upper platform 7400 at an end opposite the coupling to the first section in a first corner region of the upper platform 7400. The first section is rotatably coupled at an end opposite the coupling with the second section in a first corner region of the lower platform (not shown, see, e.g., reference numeral 6200 in FIG. 6). The first corner regions of the lower platform 7400 and the upper platform 7400 substantially overlie each other in the scaled projection (from below) (B) shown. However, the respective first and second portions of the first long arms 7311 may be coupled to the lower and upper platforms 7400 respectively, and at other regions of the lower and upper platforms 7400, respectively, to optimize the stability of the structure with respect to the application of external forces as needed.

The second long arm 7312 is coupled at one end in a second corner region of the lower platform (not shown, see, for example, reference numeral 6200 in FIG. 6) and at an end opposite the end of the second long arm 7312 to the upper platform 7400 and the guide rail 7410, respectively, so as to be rotatably coupled to the lower platform 7400 and the upper platform 7400, respectively. The short arm 7313 is coupled to the upper platform 7400 at a second corner region of the upper platform 7400. The second corner regions of the lower platform 7400 and the upper platform 7400 substantially overlie each other in a scaled projection (from below) (B). However, the second long arm 7312 may be coupled to the lower platform 7400 or the upper platform 7400 in other regions of the lower platform 7400, such as in an edge region of the lower platform 7400.

The second long arm 7312 of a respective shear 7310 includes a first portion and a second portion. The first portions of the first 7311 and second 7312 arms form a unit. The unit includes a recess to allow a second portion of a second long arm 7312 of a second shear 7310, which forms at least part of a lift 7300 with the first shear 7310, to engage the recess of the unit of the opposite shear 7310 when adjusting the height of the lift 7300. The recesses are configured to allow the lower and upper 7400 platforms to rest directly or nearly directly on each other when the lift 7300 is folded.

In the scaled projection shown (from below) (B), the two foldable stays 7310 are both point-symmetrically arranged and point-symmetrically configured relative to each other. In the spatial view, the two shears 7310 are arranged symmetrically with respect to a rotation axis (rotation by 180°). This can, for example, reduce production costs and increase the degree of isotropy of the stability of the structure, for example, with respect to rotational, translational and compressive and tensile forces. In other embodiments in which the lift 7300 comprises a plurality of shears 7310, the shears 7300 are each arranged in pairs accordingly.

5.3.3 Folded State—Scale Projections

Figure 8:
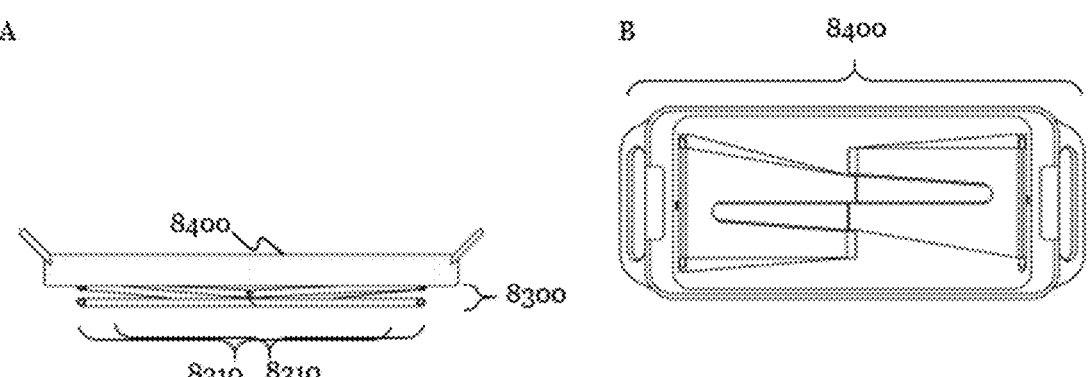
FIG. 8 shows a scaled front or rear projection (A) and a scaled projection (top view (from below) B) of an exemplary embodiment of the lift according to FIG. 6 in a folded state, coupled with an upper platform.

FIG. 8 shows a scaled front or rear projection (A) and a scaled projection (top view from below) (B) of an exemplary embodiment lift 8300 according to FIG. 6 in a folded state, coupled to an upper platform 8400. In the folded state, the foldable stays 8310 engage each other under the upper platform 8400 (cf. FIG. 7), so that the lower platform (not shown) and the upper platform 8400 are substantially on top of each other (cf. FIG. 4 C).

5.4 Detailed Views of the Coupling—Lift—Upper Platform—Perspective View

In the embodiment shown, the upper platform 9400 includes mechanics for continuously raising, lowering and locking the lift. The mechanism includes a lockable gas spring 9420 that can be used to counteract a force acting on the lift. In other embodiments, the mechanism may include a plurality of other or further components that assist in raising or lowering the lift. For example, the mechanism may include a plurality of gas springs 9420. The gas springs 9420 may further include a plunger 9421 and a cylinder 9422. In an exemplary embodiment, the cylinder 9422 is fixedly coupled to the upper platform 9400, while the plunger 9421 is movable along a cylinder axis. The mechanism further comprises a release system 9430 having a plurality of controls 9431. In an exemplary embodiment, the release system 9430 may comprise only one, two, or three controls 9431. The plunger 9421 may be locked or released by actuating one or more of the plurality of controls 9431 using the release system 9430 to lock the lift or to raise or lower the lift.

In the embodiment shown, the mechanism comprises two guide rails 9410. The guide rails 9410 each comprise a slide 9411. In other embodiments, each guide rail 9410 may also comprise multiple slides 9411. One carriage 9411 is rotatably coupled to a second long arm (see, for example, reference numeral 6312 in FIG. 6) in each case. In the embodiment shown, the mechanism further comprises a cable pull system 9440. The slides 9411 are coupled to each other by the gas spring 9420 via the cable pull system 9440. The slides 9411 are also coupled together by a cable pull system 9440. In other embodiments, the slides 9430 may be coupled to the plurality of components that assist in raising or lowering the lift via a corresponding cable pull system. Other couplings, such as belts or linkages, are also possible.

In the embodiment shown, the slides 9411 move linearly, synchronously, and in opposite directions between a first end and a second end of the guide rails 9410, thus changing the angle γ (see FIG. 6 and FIG. 7 and the associated description). The synchronous, opposing movement of the slides 9430 maintains the upper platform 9400 in a stable horizontal position with respect to the lower platform 9200, substantially parallel to the lower platform 9200.

In the embodiment shown, the pulley system 9440 forms a pulley block via movable (deflection) pulleys 9441 by which a stroke path of the plunger 9421 is doubled. For this purpose, a head of the plunger 9421 comprises two movable pulleys 9441 arranged one above the other and horizontally aligned with respect to the upper platform 9400. Two first pulleys 9442 arranged fixedly and horizontally with respect to the upper platform 9400 are attached to the upper platform 9400 in opposite edge regions of the upper platform 9400. The pulley system 9440 may include one or more cables. In the embodiment shown, the rope pulling system 9440 includes two first ropes, each attached to the upper platform 9400 at a first end in opposite edge regions. The two first ropes are substantially the same length and extend in substantially mirror-image fashion from their respective attachments to the upper platform 9400, over the movable pulleys 9441, to respective carriages 9411 to which the ropes are attached at respective second ends. A deflection of the head of the plunger 9421 pulls each of the slides 9411 in opposite directions with one-half the force of the gas spring 9420, but twice as far.

In the embodiment shown, the cable pull system 9440 further includes two second cables to provide synchronous, opposite direction movement of the slides 9411. The two second ropes couple the two slides 9411, for example, via two second pulleys 9443 that are fixed with respect to the upper platform 9400 and horizontally aligned in a respective end portion of a guide rail 9410. In the embodiment shown, the two second cables are of substantially equal length and form a closed shape with the slides 9430.

The cable pull system 9440 can also comprise toothed belts, linkages, non-circular wheels, etc., in combination with cables or other means suitable for transmitting a force to the foldable stays of the lift (cf., e.g., FIG. 6).

By actuating at least one operating element 9431 of the release system 9430, the locking of the plunger 9421 can be released for the duration of the actuation and the lift can thus be continuously adjusted in height.

When the actuation of an operating element 9431 is completed, the plunger 9421 can be locked again, whereby the slides 9431 coupled via the rope system 9440 and the shears of the lift coupled to the slides (cf., e.g., reference sign 6310 in FIG. 6) are locked in their respective positions. The plunger 9421 of the gas spring 9420 can be spring-locked in the corresponding position. Thus, the lift as a whole structure may be provided with a suspension to cushion vibrations of the undercarriage or abrupt weight changes of the carrying load of the lift, for example, caused by the movements of a small child.

In further embodiments, the design may include additional or alternative suspension systems for springing individual sections or the entire lift. The suspension systems may be integrated into one or more of a plurality of the components of the assemblies of the device for transporting loads. For example, in the form of tension or torsion spring elements integrated into, for instance, the cable pull system 9440 or the gas spring 9420.

In still further embodiments, a locking of the lift may additionally or alternatively comprise a locking of the slides 9430 against the guide rails 9410, for example, by engaging or clamping. By actuating at least one corresponding control element via a corresponding release system, the locking of the carriage 9430 can be released for the duration of the actuation, so that the lift can be adjusted in height continuously or at least in fine steps.

In a further embodiment, the lift may alternatively or additionally be adjusted and or controlled electrically, for example, by means of servomotors or a controller. Furthermore, biasing or pushing forces counteracting the weight on the lift, which can be provided, for instance, by biasing springs in the lower 9200 or the upper platform 9400, can support the adjustment of the lift when the lift is raised or lowered.

Figure 10:
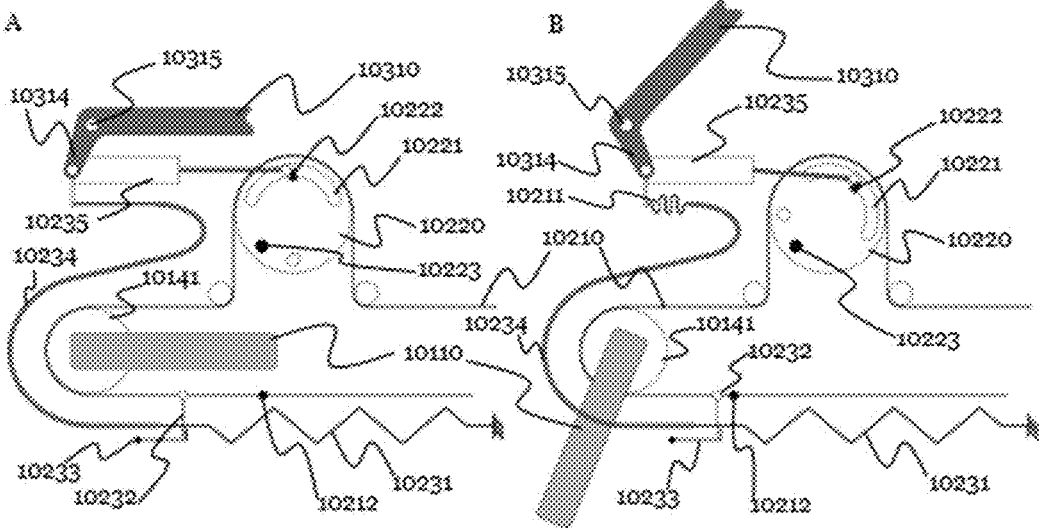
FIG. 10 shows a schematic illustration of a mechanical coupling between a lift, a lower platform and a boom of a chassis in a folded state (scheme A, lift and chassis folded) and in an opened state (scheme B, lift and chassis opened) according to an exemplary embodiment.

5.5 Schematic Diagrams of the Coupling Lift—Lower Platform—Chassis 5.5.1 Transition from a Folded to an Open State FIG. 10 shows a schematic representation of a mechanical coupling between a lift (not shown, cf., e.g., FIG. 6, FIG. 7 and FIG. 8), a lower platform and a boom of a chassis in a folded state (scheme A, lift and chassis folded) and in an opened state (scheme B, lift and chassis opened) according to an exemplary embodiment. In the folded state, the lift (only one scissor 10310 of the lift is shown to simplify the embodiment) is locked in a lowest position and the booms (only one boom 10110 is shown to simplify the embodiment) are folded under the lower platform.

In the exemplary embodiment, the scissor 10310 is coupled to an energy storage device, such as a gas spring 10235, via a bellcrank 10314. The bellcrank 10314 is rotatable about a pivot point 10315, such as coupling the scissor 10310 to the lower platform.

The gas spring 10235 is coupled to a steering wheel 10220, which includes a movement clearance 10221 that extends radially to the center of the steering wheel 10220 and is divided by a steering wheel pawl 10222. The steering wheel 10220 is locked in a first position (folded landing gear) in the folded state by a detent, for example, by a detent pin 10223.

The steering wheel 10220 is coupled to the booms 10110 by a cable 10210. The steering wheel 10220 and the boom(s) 10110, as well as the booms themselves, may also be coupled together by one or more of belts, linkages, and other mechanical couplings (see FIG. 5).

An energy storage device, such as a helical tension spring 10231, is rigidly coupled to a driver 10232, which is loosely (slidably) coupled to a cable 10210. A driver 10232 on the helical tension spring 10231 can be used to move a driver 10212 on the cable puller 10210 that is rigidly coupled to the cable puller 10210. As a result, the cable pull 10210 can be moved in a pulling direction of the helical tension spring 10231, for example, when the rigidly coupled follower 10212 on the cable pull 10210 is in a pulling path of the displaceable follower 10232 on the helical tension spring 10231. Conversely, when a helical tension spring 10231 is tensioned in a direction opposite to its direction of tension, the helical tension spring 10231 and the cable pull 10210 may be decoupled from each other.

In the folded state of the base frame (boom 10110 and lift folded), the helical tension spring 10231 may be locked, for example, by a tension spring pawl 10233. An energy stored therein may correspond to the maximum storage capacity of the energy storage device. The helical tension spring 10231 may be tensioned by moving the foldable stays 10310 of the lift to a lowest position. The helical tension spring 10231 can be tensioned via a bell crank 10314, which is coupled to the untensioned helical tension spring 10231 via a Bowden cable 10234. A tension spring pawl 10233 can hold the tensioned helical tension spring 10231 in a tensioned position. When the tensioned helical tension spring 10231 is held by the tension spring pawl 10233, the tension spring 10231 is decoupled from the lift and the lift is free to move.

While the helical tension spring 10231 is tensioned and held by the tension spring pawl 10233, the lift can be moved to a highest position. This provides the Bowden cable 10234 with a clearance 10211 and allows the tensioned helical tension spring 10231 to release its stored energy when a tension spring pawl 10233 releases the helical tension spring 10231. The slack disappears when the tensioned helical tension spring 10231 releases its stored energy, and the helical tension spring 10231 and the foldable stays 10310 of the lift are coupled together again via the Bowden cable 10234.

Figure 9:
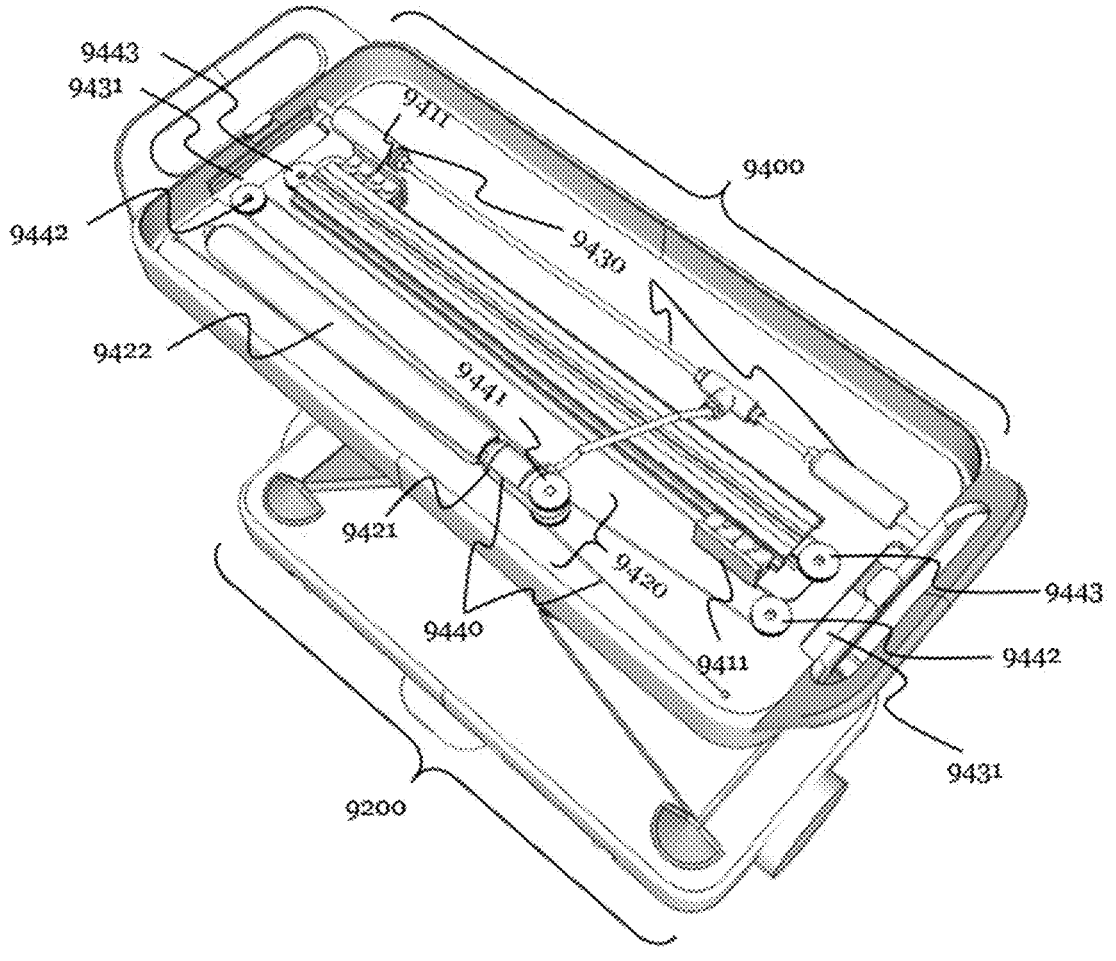
FIG. 9 shows a perspective view of an exemplary mechanism for steplessly raising, lowering, and locking an exemplary embodiment of the lift in an open condition coupled to a lower platform and an upper platform.

The energy required to open the chassis is provided by a gas pressure spring (not shown, see reference numeral 9420 in FIG. 9). By pushing the lift down to its lowest position, energy can be stored in one or more lockable gas springs in the upper platform. The gas springs can be released by a control element (not shown), which may be attached to a push handle or to the side of an upper platform (not shown), for example.

When the lift is opened, only part of the energy stored in the gas spring in the upper platform is consumed. It causes a change in the angle of the foldable stays of the lift, which changes an angle of an angle lever 10314 via a pivot point 10315. This transfers the energy of the gas spring in the upper platform to an energy storage device, such as a gas spring 10235 in the lower platform, by compressing it between an angle lever 10314 and a control wheel pawl 10222 of a control wheel 11220 that can be locked with a locking pin 11223.

The chassis can now be opened "at the push of a button" by actuating an operating element (not shown), for example, via a WLAN signal. By actuating the control element, a locking bolt 10223 is released by, for example, a solenoid (not shown) and the control wheel 10220 is thereby unlocked, allowing the compressed gas spring 10235 to move the control wheel 10220 by pressing on a control wheel pawl 10222. The steering wheel 10220 is thereby rotated from a first position (folded landing gear) to a second position (opened landing gear). A cable 10210 coupled to the steering wheel 10220 transmits the rotational movement to the booms 10110, causing them to unfold.

The unfolding of the booms 10110 is delayed in time so that they do not block each other during unfolding and the undercarriage remains stable and does not tilt (see FIG. 5). The time delay can be provided by the cable pull 10210 described here and appropriately placed drivers (not shown). Alternatively, or additionally, the time delay may be provided by coupling the booms 10110 to each other independently of the cable pull 10210 (see FIG. 5), or by a combination of the above exemplary embodiments.

A locking pin 10223 can automatically lock the control wheel 10220 in a second position (open landing gear). Locking the control wheel 10220 may also lock the booms 10110, which are coupled via the cable 10210, in an open position. Locking the booms 10110 in the open position may be done alternatively or additionally, as well as separately and independently of the coupling with the control wheel 10220 described herein.

In other embodiments, the mechanical couplings may alternatively or additionally include a variety of the components shown, such as additional cables, linkages, toothed belts, non-circular wheels, energy storage devices, or locking devices.

5.5.2 Transition from an Open to a Folded State

Figure 11:
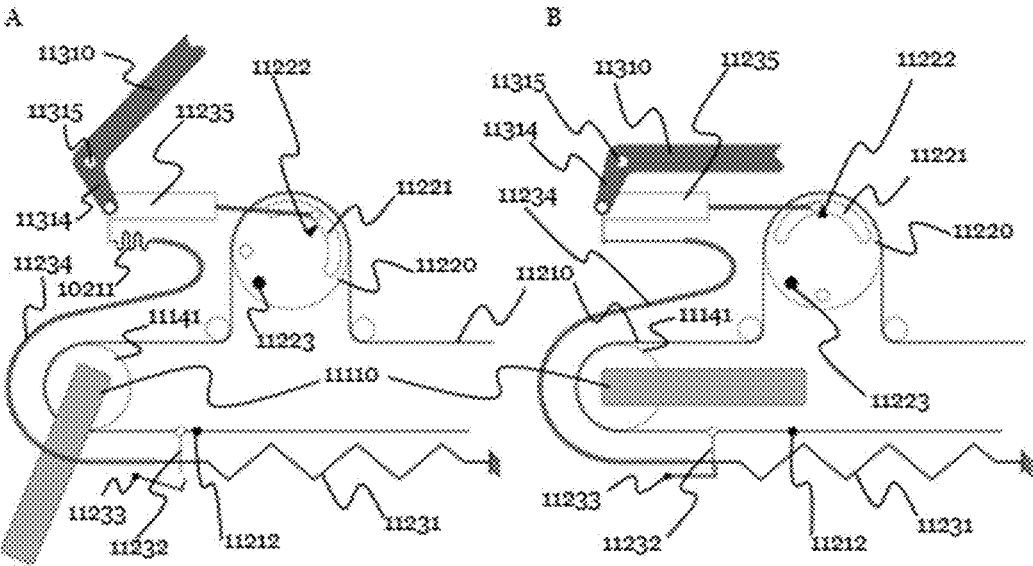
FIG. 11 shows a schematic representation of a mechanical coupling between a lift, a lower platform and a boom of a chassis during the transition from an open state (A, lift and chassis open) to a folded state (B, lift and chassis folded) according to an exemplary embodiment.

FIG. 11 shows a schematic diagram of a mechanical coupling between a lift (not shown, cf. e.g. FIG. 6, FIG. 7 and FIG. 8), a lower platform and a boom of a chassis during the transition from an open (A, lift and chassis open) to a folded state (B, lift and chassis folded) according to an exemplary embodiment.

The energy for automatic folding of the chassis is provided by an intermediate energy storage device, for example, a helical tension spring 11231.

To automatically fold the chassis, the lift is moved to its highest position. The automatic folding of the chassis "at the push of a button" can be triggered by actuation of an operating element (not shown), for example, by lifting magnets (not shown) activated wirelessly via a WLAN signal, a locking bolt 11223 is released and the control wheel 11220 is unlocked, a control wheel pawl 11222 is released and a movement clearance 11221 of a coupling of the control wheel 11220 and the gas pressure spring 11235 is completely released, a tension spring pawl 11233 is released and a helical tension spring 11231 is released. The released helical tension spring 11231 can transfer its stored energy to the driver 11212 on the cable puller 11210 via the driver 11232 on the helical tension spring 11231, thereby transferring its tension path to the cable puller 11210, which moves in a counterclockwise direction. A number of drivers can be coupled to the rope hoist 11220 in order to fold in the booms 11110.

The folding of the booms 11110 is delayed so that they do not block each other during folding and the chassis always remains stable and does not tilt (see FIG. 5). The time delay can be provided by the cable pull 11210 described here and the appropriately placed drivers (not shown). Alternatively or additionally, the time delay can be provided by coupling the booms 11110 to each other independently of the cable pull 11210 (see FIG. 5), or by a combination of the above exemplary embodiments.

During folding, the control wheel 11220 is rotated from a second position (open landing gear) to a first position (folded landing gear) and automatically locked by a locking pin 11223. Further, the clearance 11221 of the Bowden cable 11234 disappears due to the shortening of the helical tension spring 11231, and the Bowden cable is tensioned.

In order to re-couple the lift and the booms 11110 and to re-power the energy storage devices necessary for the automatic opening and folding of the chassis "at the push of a button", the lift is manually pushed from the highest to the lowest position. Energy can thus be stored in a lockable gas pressure spring in the upper platform (not shown, see reference numeral 9420 in FIG. 9).

When the lift is manually pressed down from the highest to the lowest position, the helical tension spring 11231 is tensioned by turning an angle lever 11314 on the foldable stays 11310 of the lift, which is coupled to the helical tension spring 11231 via a Bowden cable 11234. Finally, the tensioned helical tension spring 11231 can be held in a tensioned state by a tension spring pawl 11233.

Further, when the lift is manually pushed down from the highest position to the lowest position, the rotation of the angle lever 11314 pulls the gas spring 11235 to its position in the folded state. In this position, the gas spring 11235 is again coupled to the steering wheel 11220 in the movement clearance in the steering wheel 11220 by the steering wheel pawl 11222 behind a head of the piston rod of the gas spring 11235 again dividing the movement clearance 11220. This allows the lift and the steering wheel 11220 to be coupled together again.

The opening and folding of the undercarriage may be supplemented electromechanically or replaced in whole or in part by electromechanical means. The opening and folding of the chassis can also be implemented with only partial or no power assistance and with only partial or no coupling of the individual motion sequences.

5.6 Coupling Lower Platform—Boom—Steering Forks—Perspective Views

Figure 12:
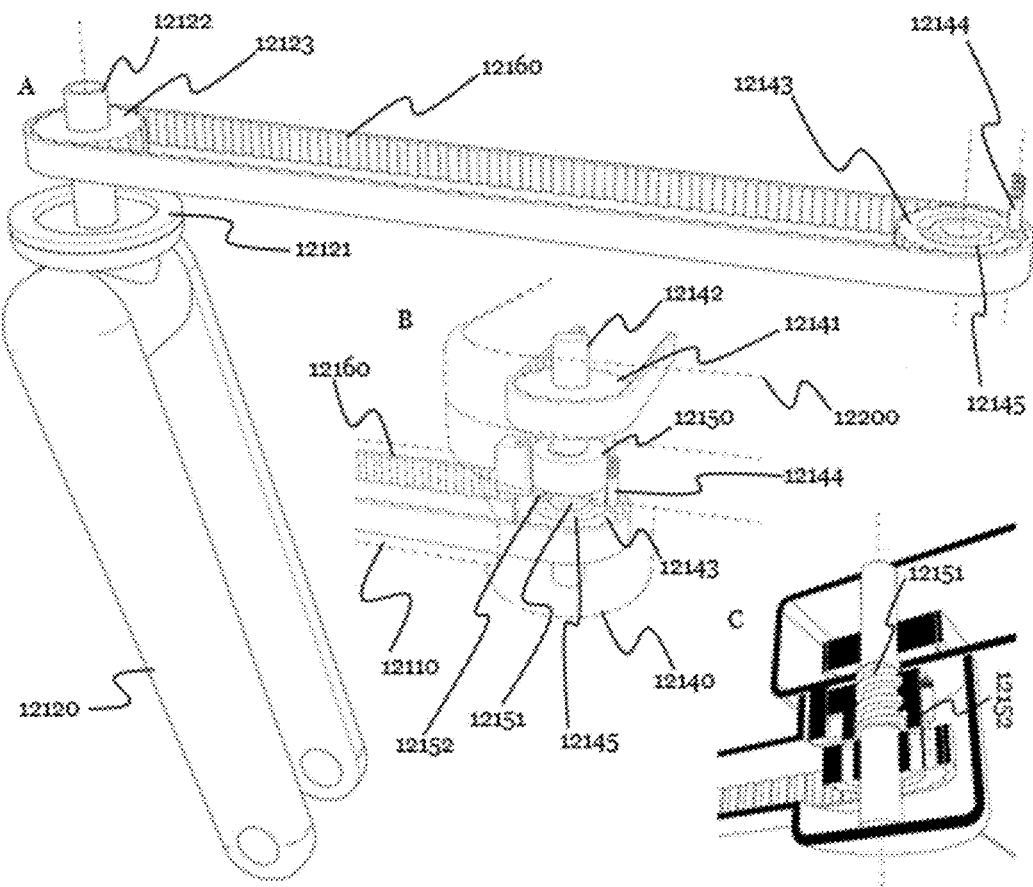
FIG. 12 shows three perspective views of an exemplary embodiment of a mechanical coupling of the lower platform to a boom and a mechanical coupling of the booms to a steering fork.

FIG. 12 shows three perspective views of an exemplary embodiment of a mechanical coupling of the lower platform 12200 with a boom 12110 and a mechanical coupling of the boom 12110 with a steering fork 12120. When the chassis is folded, the steering forks 12120 can be automatically aligned in an intended end position (cf. FIG. 4). In an open state of the chassis, the steering forks 12120 can be locked in pairs, front or rear, either free to rotate 360° or locked in alignment with the direction of travel of the chassis.

Both operations—the automatic alignment of the wheels when folded, and the locking or releasing of the steering forks 12120 in pairs in the open state—can be controlled or commanded, for example, by a mechanical coupling of pivot joints 12121 of the steering forks to the booms 12110 and of pivot joints 12140 of the booms to the lower platform 12200.

All of the steering forks 12120 may be rigidly coupled to vertical axles 12122, which are rigidly coupled to toothed pulleys 12123, which are coupled to toothed pulleys 12143 via toothed belts 12160, which are rotatably coupled to vertical axles 12142, which are rigidly coupled to booms 12110 and rotatably coupled to lower platform 12200.

The locking of the steering forks 12120 and the wheels coupled thereto is performed in pairs at the front and/or rear by an activation of locking pins 12144 on toothed belt wheels 12143 by, for example, lifting magnets (not shown), which can be controlled, for example, via WLAN by actuating an operating unit (not shown). The activated locking pins 12144 can engage in pairs in toothed belt wheels 12143 as soon as the wheels to be locked (not shown) are correctly aligned by pushing the chassis back and forth (cf. e.g. reference sign 1100 in FIG. 1). The activated locking pins 12144 can lock the steering forks 12120 via coupled toothed belts 12160. This allows the orientation of the wheels to be fixed.

During the opening and folding of the chassis, the wheels can be automatically aligned (caster) with the directions of movement of the booms 12110 by a slight inclination of the forks and can roll over the ground at any time without dragging or locking.

Shortly before an end of a rotational movement of the booms 12110, the wheels may be substantially at right angles to the booms 12110 during the caster. In their final positions, the wheels may be rotated about 90° from their previous direction of travel in the course of the caster, for example, when folded parallel to the wider sides of the lower platform 12200 (see FIG. 4).

Automatic alignment of the steering forks 12120 when folding the chassis can be achieved, for example, by mechanically coupling rotary joints 12121 of the steering forks with rotary movements at rotary joints 12140 of the booms. The rotational movements of the booms 12110 for opening and folding the chassis are affected and controlled by pinions 12141. The pinions 12141 can transmit the rotary movements to the booms 12110 via vertical axles 12142.

When vertical axles 12142 of the booms rotate during a closing operation, displaceable gears 12150, which are secured against rotation on the lower platform 12200, are displaced axially in the direction of the toothed belt wheel 12143 via threads 12151. A displaceable gear wheel 12150 forms a claw coupling with a toothed belt wheel 12143: in the last third of a rotational movement during a closing operation of a boom 12110, claws of a displaceable toothed wheel 12150 engage in movement clearances 12145 of a toothed belt wheel 12143 and rotate the latter in a coupled manner A rotational movement of a toothed belt wheel 12143 is transmitted via a coupled toothed belt 12160 to a steering fork 12120, which turns a wheel (not shown) to an intended end position (cf. FIG. 4).

A constant or variable transmission ratio can be generated between two toothed belt wheels 12123 and 12143 via a shape and/or number of teeth, by which a choreography of motion sequences of the booms 12110 and alignments of the wheels (not shown) can be optimized during an unfolding and folding of the chassis.

An unfolding of the booms 12110 occurs in reverse order and mode of operation. In an electromechanical variant, the steering forks can alternatively or additionally be moved and controlled electrically, for example, by servomotors.

5.7 Attachments (Lounger/Seat/Multifunctional Platform)

5.7.1 Lounger—Perspective View

Figure 13:
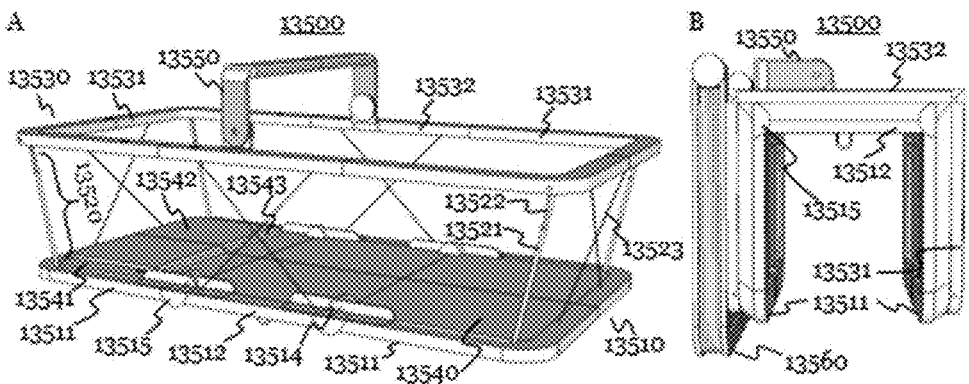
FIG. 13 shows an overall perspective view of an exemplary embodiment of a foldable, three-part lounger in an open state (view A, without sun canopy) and a folded state (view B, with sun canopy).

FIG. 13 shows a perspective overall view of an exemplary embodiment of a foldable, three-part lounger 13500 in an opened (view A, without sun canopy) and a folded state (view B, with sun canopy). A supporting structure of the lounger 13500 includes a foldable lower frame 13510 and a foldable upper frame 13530. The lower 13510 and upper 13530 frames are coupled together by a foldable side wall 13520. The foldable sidewall 13520 may include two tensioning brackets 13521 and eight crossed tensioning wires 13523. The opened lounger 13500 is inherently stable as an attachment and can be used separately as such. The lounger 13500 can be coupled to and uncoupled from the upper platform (not shown, see, for example, FIG. 1, reference numeral 1400).

The lower 13510 and upper 13530 frames are foldable and each include two side frame segments 13511 and 13531 and a middle frame segment 13512 and 13532.

The upper middle 13532 and side 13531 frame segments are rotatably coupled at their undersides by four spring hinges (not shown) that allow the side 13531 frame segments to be angled 90° from horizontal to vertical only. The spring force of the spring hinges (not shown) counteracts a downward angling of the lateral frame segments 13531 into the vertical and supports their folding up into the horizontal.

The lower center 131512 and side 13511 frame segments are likewise rotatably coupled at their tops by four spring hinges (not shown) that allow the side frame segments 13511 to be angled 90° downward from horizontal to vertical and upward beyond horizontal.

The spring force of the spring hinges (not shown) counteracts downward angling of the lateral frame segments 13511 into the vertical and assists their folding upward into the horizontal.

The lower center 13512 and side 13511 frame segments are additionally rotatably coupled by 4 detent fittings 13514, which—like the 4 spring hinges (not shown)—allow the side frame segments 13511 to be angled downwards from the horizontal by 90° into the vertical. When the lower lateral frame segments 13511 are folded from the vertical to the horizontal, the detent fittings 13514 engage.

In the embodiment shown here, the ends of the lower middle 13512 and side 131511 frame segments are shaped to visually close outwardly with virtually no gaps through a panel 13515 in an open, horizontal position.

Lower frame 13510 and upper frame 13530 are coupled by 2 hinged clamping brackets 13521 and crossed clamping wires 13523. In the corner areas, the upper lateral frame segments 13531 are rotatably coupled at the base with one tensioning bracket 13521 each. High-torque leg springs 13522 press the clamping yokes 13521 downward in the vertical direction against the lower lateral frame segments 13511, where they engage in detent levers (not shown).

Countering the tensioning brackets 13521 are 4 by 2 crossed tensioning wires 13523 between the upper center 13532 and lower center 13512 frame segments, and between the upper side 13531 and lower side 13511 frame segments.

A 3-piece base 13540 lies on top of the lower frame 13510. The top portion of the base 13541 includes a flap 13542 that can be used to tilt a 3-piece mattress lying on the base to allow a child to be bedded in a semi-sitting position. The flap 13542 is locked in place by torque hinges 13543.

A retaining bracket 13550 for the cot 13500 is pivotally coupled to the upper center frame segment 13532 at the center.

The retaining bracket is secured by two lock tabs on the underside of the ends of the retaining bracket, which can be anchored to the top of the upper middle frame segments in receiving locks. In the middle of the retaining bracket is an operating unit with which the lock tongue can be released and the retaining bracket removed. The solution may be provided by Bowden cables routed inside the retaining bracket between the operating unit and the lock tongue.

Neodymium permanent magnets are embedded in the head section of the upper frame segment on the upper side, through which the sun canopy can be attached to the lounger.

The side wall of the sunbed is enclosed from the outside by a textile fabric folded in origami. Origami folding is a symmetrically repeating sliding reflection. When the upper frame is lowered onto the lower frame, the side wall of the tub precisely folds vertically.

On the undersides of each of the two middle lower frame segments is a lock tongue that allows the lounger to be docked in the two receptacle locks on the top of the upper platform.

On both sides of the upper platform are the actuating units for unlocking the attachment lock tongue so that the trough can be removed from the chassis.

For folding the lounger from an open state, two clamping brackets 13521 coupled to the upper lateral frame segments 13531 are manually released from their locking by detent levers (not shown) below the lower lateral frame segments 13511 (at the head and foot ends of the lower frame 13510) in order to manually press the upper frame 13530 vertically downwards onto the lower frame 13510, whereby the clamping brackets 13521 are pressed into a horizontal position against a force of the leg springs 13522 towards the lower central frame segment 13512. For this purpose, grooves (not shown) are recessed laterally on the inside of the upper side of the lower lateral frame segments 13511, along which the lower, freely movable corners of the clamping brackets 13521 slide when the lounger 13500 is opened and folded.

Subsequently, the lower lateral frame segments 13511 are angled upwardly at an acute angle to release the locking of the latching brackets 13514 between lower central 13512 and lateral 14511 frame segments by switching. The entire lounger, including mattress (not shown) and sun canopy 13560, can then be folded downward into a vertical position. A retaining bracket 13550 rotatably coupled to the upper middle frame segments 13532 is folded down from vertical to horizontal.

The folded lounger 13500 encloses the folded base frame (not shown, see FIG. 2). The lounger 13500 can be folded with sun canopy 13560.

To open the lounger 13500 from the folded state, the lower lateral and upper lateral frame segments 13511, 13531 (head and foot sections of the lounger), which lie on top of each other, are first brought up 90° from their vertically downwardly folded position to the horizontal position. There, the latching fittings between lower middle 13512 and lateral 13511 frame segments automatically engage so that the lower frame 13510 remains rigid.

Due to spring forces of the spring hinges (not shown) between the lower frame segments 13511 and 13512 and the upper frame segments 13531 and 13532, and due to spring forces of the leg springs at the tensioning brackets 13521, the upper frame of the tub rises automatically and pulls the side wall of the lounger along. By briefly raising the upper side frame segments 13531, the lower movable ends of the nearly vertically oriented clamping brackets 13521 engage latching levers (not shown) centered inwardly at the outer ends on the underside of the lower side frame segments 13511. The lounger can be removed as needed by triggering an actuator (not shown).

5.7.2 Seat—Perspective View

Figure 14:
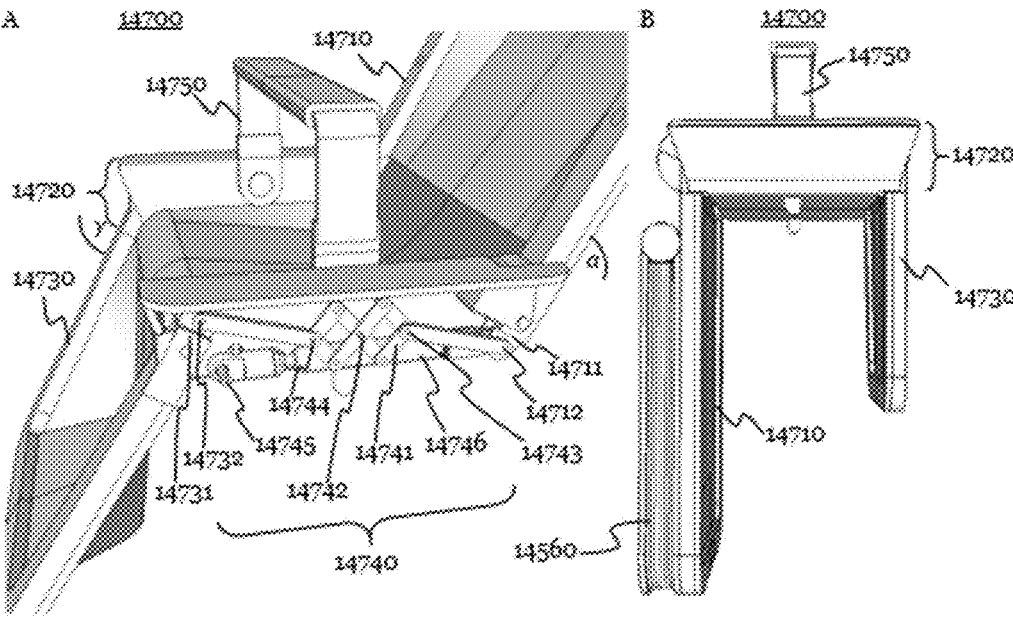
FIG. 14 shows a perspective overall view of an exemplary embodiment of a foldable, three-piece seat in an open state (view A, without sun canopy) and in a folded state (view B, with sun canopy).

FIG. 14 shows an overall perspective view of an exemplary embodiment of a foldable, three-piece seat 14700 in an open state (view A, without sun canopy) and in a folded state (view B, with sun canopy). A supporting structure includes a three-piece frame. The three-part frame includes a frame segment in the form of a backrest 14710 and a frame segment in the form of a leg rest 14730 rotatably coupled to a middle frame segment in the form of a seat portion 14720.

A retaining bracket 14750 is rotatably coupled to the seat portion 14720. The retaining bracket is secured by two lock tabs on the underside of the ends of the retaining bracket, which can be anchored to receptacle locks on the top of the middle frame segments. In the middle of the retaining bracket is an operating unit with which the lock tongue can be released and the retaining bracket removed. The solution may be provided by Bowden cables routed inside the retaining bracket between the operating unit and the lock tongue.

Neodymium permanent magnets are embedded in the head section of the sports seat on the upper side of the frame, through which the sun canopy can be attached. A textile cover, for example, is made in 3D-knitted fabric and is removably attached by a welting system.

The backrest 14710 and the leg rest 14730 may be coupled via a stretching scissor mechanism 14740 for continuously and symmetrically or asymmetrically adjusting the angles of inclination of the backrest 14710 and the leg rest 14730. The extensor scissor mechanism 14740 may be coupled to a resiliently locking gas spring 14746 for locking the backrest 14710 and the leg rest 14730. The stretch shear mechanism 14740 and the gas spring 14746 may be similarly coupled to the seat portion 14720.

Gas springs 14746 are pivotally coupled to respective left and right lever arms 14731 of the leg rest or, as in the exemplary embodiment shown, to lever arms 14711 of the back rest. Lever arms are extensions of the frame segments of the backrest 14710 and leg rest 14730 beyond their rotatable coupling to the seat portion 14720. A pressure from gas springs 14746 assists in folding backrest 14710 up or down from a horizontal position toward a vertical position ($\geq -90°$ or $\leq +90°$). A resilient blocking of the gas spring 14746 by an operating unit (not shown) locks the backrest 14710 in a desired position. Resilient locking of gas springs 14746 allows backrest 14710 and leg rest 14730 to cushion loads, increasing seating comfort. The gas springs can be released by a control element mounted on the front side of the backrest which controls both gas springs, e.g., synchronously, via a hydraulic system.

The stretching shear mechanism 14740 can synchronously transmit a change in an engagement point of a lever arm of the backrest 14712 to an engagement point of a lever arm of the leg rest 14732. In an opened state of the seat 14700, the engagement points 14712 and 14732, and 14743 and 14744 of the stretching shear mechanism 14740 may be point-symmetric with respect to a center of the stretching shear mechanism 14742.

In the exemplary embodiment shown in FIG. 14, the backrest 14710 of the seat 14700 assumes an angle $\alpha$ of $+45°$ in an open state, a lever arm of the backrest 14711 assumes an angle $\beta$ of $-135°$, the leg rest 14730 assumes an angle $\gamma$ of $-45°$, and a lever arm of the leg rest 14731 assumes an angle $\delta$ of $+135°$. If an angle $\alpha$ of the backrest 14710 between the horizontal and the upward vertical (between 0° and 90°) is changed, an angle $\beta$ of a lever arm 14711 of the backrest between the horizontal and the downward vertical (between $-180°$ and $-90°$) is changed analogously.

If a position of an engagement point 14712 of a lever arm of the backrest changes, a coupled engagement point 14743 of the stretching shear changes. If a distance of an attack point 14743 to a rotatably fixed center 14742 of the stretching shear changes, an attack point 14744 to a rotatably fixed center 14742 of the stretching shear changes in an opposite direction in a point-symmetrical manner.

By coupling an attack point 14744 of the stretching shear with an attack point 14732 of a lever arm of the leg rest, the latter changes its position point-symmetrically with respect to an attack point 14712 of a lever arm of the back rest and changes an angle $\delta$ identical to an angle $\beta$ and an angle $\gamma$ identical to an angle $\alpha$.

In the open state, any change in an angle $\alpha$ of the backrest 14710 between horizontal and upward vertical (between 0° and 90°) is point-symmetrically coupled to an angle $\gamma$ of the leg rest between horizontal and downward vertical (between $-180°$ and $-90°$) by a stretching shear mechanism 14740.

When the backrest 14710 is folded downward (α<0°) above the horizontal (α=0°), a stopper 14745 prevents the leg rest 14730 from further point-symmetrically aligning with the backrest 14710, so that it aligns axisymmetrically with the backrest 14710 from that point (α<0°) and likewise folds downward (α<0°=β). If an angle α of the backrest 14710 is less than 0°, the engagement points 14712 and 14732, and 14743 and 14744 of the stretching shear mechanism 14740 are axisymmetric with respect to an axis extending vertically through a center of the stretching shear 14742.

The open seat 14700 can be docked and undocked on the upper platform of the lift (not shown, see reference numeral 1400 in FIG. 1) by actuating units (not shown).

When the seat 14700 is folded into its folded size, the backrest 14710 may be folded vertically downward from an upwardly tilted or horizontal position. To the extent that the backrest 14710 reaches horizontal by tilting down, the leg rest 14730 may synchronously tilt upward and may reach a substantially horizontal position. Further downward folding of the backrest 14710 may cause the leg rest 14730 to change its direction of movement and may fold downward in an axisymmetric manner until both backrests are folded vertically downward. The folded seat 14700 encloses the folded base frame (not shown, see FIG. 4, reference numeral 4100). As illustrated, the seat 14700 can also be folded with a sun canopy 14560.

5.7.3 Multifunctional Platform—Perspective View

Figure 15:
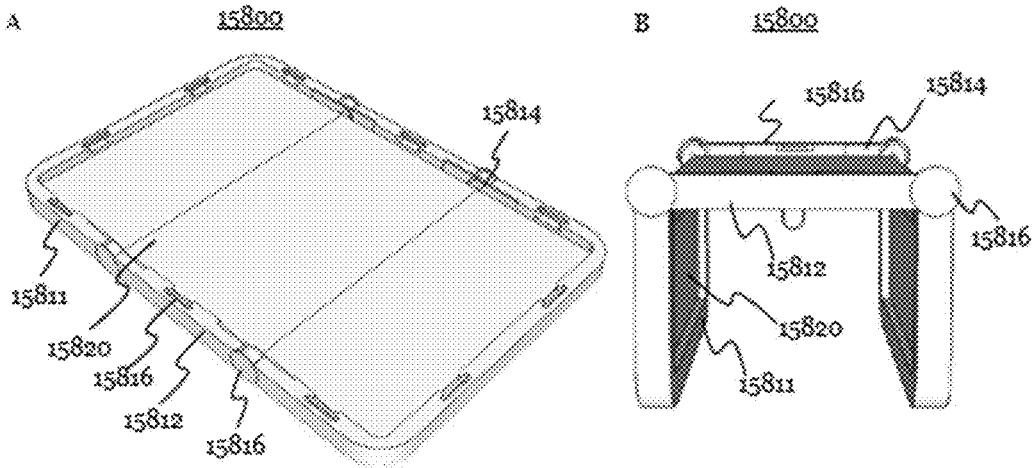
FIG. 15 shows a perspective overall view of an exemplary embodiment of a foldable, three-part multifunctional platform in an opened and a folded state.

FIG. 15 shows an overall perspective view of an exemplary embodiment of a foldable, three-part multifunction platform 15800 in an open state and a folded state as one possible attachment.

A supporting structure of the multi-functional platform 15800 includes a foldable frame and a foldable, three-part floor 15820 left in the frame. The opened multi-functional platform 15800 is inherently stable as an attachment and separately usable as such. The multifunctional platform 15800 can be coupled to and uncoupled from the upper platform (not shown, cf. e.g. FIG. 1, reference numeral 1400).

The frame and the floor 15820 may together form a trough when open. The tub is sized to correspond to the footprint of various Euronorm containers or common beverage crates. A plurality of attachment mounts 15816 are provided on the top of the frame, which can be used to attach straps or ropes, etc., to secure the loads to be transported.

In the illustrated embodiment, the frame is foldable and includes two side frame segments 15811 and two middle frame segments 15812. The middle 15812 and side 15811 frame segments are also rotatably coupled by four detent fittings 15814. The detent fittings allow the lateral frame segments 15811 to be angled downward 90° from the horizontal to the vertical. When the lateral frame segments 15811 are folded from the vertical to the horizontal, the detent fittings 15814 engage.

In the embodiment shown here, the ends of the middle 15812 and side 15811 frame segments are shaped so that they are visually closed off from the outside by a panel 15815 in an open, horizontal position with virtually no gaps.

A lock tongue is attached to the undersides of each of the two middle frame segments 15812, with which the multifunction platform can be docked in the two receptacle locks on the upper side of the upper platform. Actuating units for unlocking the lock tongue of the attachment can be arranged laterally, on one or both sides, on the upper platform of the attachment. When unlocked, the multifunction platform can be removed from the chassis.

To fold the multifunction platform 15800, the side frame segments 15811 can be angled upward through an acute angle to release the detent of the latching fittings 15814 between the center 15812 and side 15811 frame segments by switching. The multifunction platform can then be folded downward into the vertical position.

6 LIST OF REFERENCE SIGNS

The reference signs are of the form wxyz. The first digit w designates the number of the drawing. The first digit x denotes an assembly in the drawing w. The last two digits y and z denote a sub-element z of an element y of the assembly x in the drawing w.

| | |
|---|---|
| w000 | device for transporting loads |
| w100 | chassis |
| w110 | boom |
| w120 | steering fork |
| w121 | swivel joint |
| w122 | vertical axis |
| w123 | toothed belt wheel |
| w130 | wheel |
| w140 | boom pivot |
| w141 | pinion |
| w142 | vertical axis |
| w143 | toothed belt wheel |
| w144 | locking pin toothed belt wheel |
| w145 | clearance |
| w150 | slidinggear |
| w151 | thread |
| w152 | claws |
| w160 | toothed belt |
| w200 | lower platform |
| w210 | cable |
| w211 | clearance |
| w212 | driver on cable |
| w220 | steering wheel |
| w221 | clearance |
| w222 | steering wheel pawl |
| w223 | locking bolt |
| w231 | coil tension spring |
| w232 | follower on w231 |
| w233 | tension spring pawl |
| w234 | bowden cable |
| w235 | gas spring |
| w240 | slider pivot |
| w300 | lift |
| w310 | foldable stays |
| w311 | first long arm |
| w312 | second long arm |
| w313 | short arm |
| w314 | angle lever |
| w315 | pivot point |
| w400 | upper platform |
| w410 | guide rail |
| w411 | carriage |
| w420 | gas spring |
| w421 | plunger |
| w422 | cylinder |
| w430 | release system |
| w431 | operating element |
| w440 | cable pull system |
| w441 | movable rollers |
| w442 | first rollers |
| w443 | second rollers |
| w500 | lounger |
| w510 | lower frame |
| w511 | ower lateral frame segment |
| w512 | lowermiddle frame segment |
| w514 | detent fitting |
| w515 | orifice plate |
| w520 | side wall |
| w521 | clamping bracket |
| w522 | torsion spring |
| w523 | tension wire |
| w530 | upper frame |

-continued

| | |
|---|---|
| w531 | upper lateral frame segment |
| w532 | uppermiddle frame segment |
| w540 | base |
| w541 | head part of base |
| w542 | flap |
| w543 | torque hinge |
| w550 | retaining bracket |
| w560 | sunhood |
| w600 | swivel slider |
| w610 | slider handle |
| w620 | telescopic arm |
| w700 | seat |
| w710 | backrest |
| w711 | lever arm of backrest |
| w712 | point of action lever arm backrest |
| w720 | seat part |
| w730 | leg rest |
| w731 | lever arm of leg rest |
| w732 | point of action lever arm leg rest |
| w740 | extension foldable stays mechanism |
| w741 | stretching foldable stays |
| w742 | center point of stretching shear |
| w743 | point of action stretching shear backrest |
| w744 | point of action shear leg rest |
| w745 | stopper |
| w746 | gas spring |
| w750 | retaining bracket |
| w800 | multifunction platform |
| w811 | lateral frame segment |
| w812 | middle frame segment |
| w814 | detent fitting |
| w815 | orifice plate |
| w816 | mounting bracket |
| w820 | base |

The invention claimed is:

1. A foldable device for transporting loads, comprising:
a first platform;
a second platform; and
a lift with a plurality of foldable shears rotatably coupled to the first platform and the second platform;
wherein each of the plurality of foldable shears comprises a first elongated arm, a second elongated arm and a short arm, each of the first elongated arms, the second elongated arms, and the short arms having and maintaining a fixed length during folding of the foldable device;
wherein each of the first elongated arms is rigidly coupled to a respective one of the second elongated arms;
wherein each of the first elongated arms is foldable and each of the short arms is rotatably coupled to the second platform and rotatably connected to a respective one of the second elongated arms.

2. The foldable device according to claim 1 further comprising:
a chassis having a plurality of booms each having an associated wheel, wherein each of the plurality of booms is coupled to the first platform.

3. The foldable device according to claim 2 further comprising:
a first mechanical coupling comprising a plurality of rotary joints, each rotary joint configured to rotatably couple a respective boom of the plurality of booms with the first platform;
a second mechanical coupling comprising a plurality of steering forks, each steering fork configured to rotatably couple a respective wheel with its associated boom;

wherein the first mechanical coupling is configured to align the plurality of booms with the first platform in at least one opened state and in at least one folded state; and
wherein the second mechanical coupling is configured to align each wheel with its associated boom in at least one opened state and in at least one folded state.

4. The foldable device according to claim 3 wherein the plurality of booms and the plurality of wheels have different angles of rotation, and the plurality of crossbeams and the plurality of booms are disposed below the first platform in the folded state.

5. The foldable device according to claim 2 wherein the plurality of booms are lockable in the folded and opened states.

6. The foldable device according to claim 2, wherein each wheel is connected to its associated boom by a steering fork that is coupled with the boom and configured to rotate relative to the boom in an opened state of the chassis, wherein the rotation of the steering fork relative to the boom is configured to be lockable.

7. The foldable device according to claim 1 wherein the second platform comprises a plurality of guide rails, and wherein the second elongated arm of each one of the foldable shears is rotatably coupled to at least one of the plurality of guide rails via one or more carriages.

8. The foldable device according to claim 7 wherein one or more of the carriages are synchronously coupled for raising and lowering the lift.

9. The foldable device according to claim 1 wherein the second platform further comprises a spring for raising and lowering the lift.

10. The foldable device according to claim 1 wherein the foldable device further comprises a foldable attachment, the foldable attachment configured for coupling to the second platform.

11. The foldable device according to claim 1, wherein, in a folded state, the foldable device comprises a cuboid shape.

12. The foldable device according to claim 2 wherein the lift and the chassis are mechanically couplable with each other.

13. The foldable device according to claim 2, wherein energy for automatically opening or closing the chassis is provided by one or more springs provided in at least one of the first platform or the second platform.

14. The foldable device according to claim 1, wherein the foldable device is one selected from the group consisting of a stroller and a transport cart.

15. The foldable device according to claim 1, wherein the first elongated arm of a first shear of the plurality of foldable shears is coupled to the first platform at a first corner region of the first platform and coupled to the second platform at a first corner region of the second platform; and wherein the second elongated arm of the first shear of the plurality of foldable shears is coupled to the first platform at a second corner region of the first platform and coupled to a guide rail of the second platform.

16. The foldable device according to claim 1, wherein the short arm of a first shear of the plurality of foldable shears is rotatably coupled to the second platform at a second corner region of the second platform.

17. The foldable device according to claim 1, wherein the first elongated arm of a second shear of the plurality of foldable shears is coupled to the first platform at a third corner region of the first platform and coupled to the second platform at a third corner region of the second platform; and wherein the second elongated arm of the second shear of the plurality of foldable shears is coupled to the first platform at a fourth corner region of the first platform and coupled to a guide rail of the second platform.

18. The foldable device according to claim 1, wherein a position of the coupling of each of the first elongated arms with the first platform and a position of the coupling of each of the first elongated arms with the second platform does not change during folding of the foldable device.

* * * * *